(12) United States Patent
Miao

(10) Patent No.: US 10,936,482 B2
(45) Date of Patent: Mar. 2, 2021

(54) METHODS FOR CONTROLLING SSD (SOLID STATE DISK) AND APPARATUSES USING THE SAME

(71) Applicant: Shannon Systems Ltd., Shanghai (CN)

(72) Inventor: Ningzhong Miao, Shanghai (CN)

(73) Assignee: SHANNON SYSTEMS LTD., Shanghai (CN)

(*) Notice: Subject to any disclaimer, the term of this patent is extended or adjusted under 35 U.S.C. 154(b) by 64 days.

(21) Appl. No.: 15/865,469

(22) Filed: Jan. 9, 2018

(65) Prior Publication Data
US 2018/0341579 A1    Nov. 29, 2018

(30) Foreign Application Priority Data
May 26, 2017 (CN) .......................... 201710384048.0

(51) Int. Cl.
*G06F 12/02* (2006.01)
*G06F 3/06* (2006.01)

(52) U.S. Cl.
CPC .......... *G06F 12/0246* (2013.01); *G06F 3/061* (2013.01); *G06F 3/0631* (2013.01); *G06F 3/0659* (2013.01); *G06F 3/0679* (2013.01); *G06F 12/0292* (2013.01); *G06F 2212/2022* (2013.01); *G06F 2212/7201* (2013.01); *G06F 2212/7202* (2013.01)

(58) Field of Classification Search
CPC .... G06F 12/0246; G06F 3/061; G06F 3/0659; G06F 3/0679; G06F 12/0292; G06F 2212/2022; G06F 3/0631; G06F 2212/7201; G06F 2212/7202; G06F 12/0646

See application file for complete search history.

(56) References Cited

U.S. PATENT DOCUMENTS

| 9,213,632 | B1 | 12/2015 | Song et al. |
| 2009/0150597 | A1 | 6/2009 | Yang et al. |
| 2012/0278512 | A1* | 11/2012 | Alatorre ................ G06F 3/0604 710/33 |
| 2015/0106410 | A1 | 4/2015 | Zaltsman et al. |
| 2015/0234599 | A1 | 8/2015 | Cohen |
| 2016/0062908 | A1 | 3/2016 | Shen et al. |
| 2016/0070653 | A1 | 3/2016 | Shen |

(Continued)

FOREIGN PATENT DOCUMENTS

| CN | 102799534 | 11/2012 |
| CN | 102799534 A | 11/2012 |

(Continued)

*Primary Examiner* — Charles Rones
*Assistant Examiner* — Tong B. Vo
(74) *Attorney, Agent, or Firm* — McClure, Qualey & Rodack, LLP

(57) ABSTRACT

A method for controlling an SSD (Solid State Disk), performed by a processing unit when loading and executing a driver, including: obtaining a data access command including information indicating a namespace, a command type, and a logical storage address; determining one of a plurality of storage mapping tables according to the namespace; reading a physical location corresponding to the logical storage address from the determined storage mapping table; generating a data access request including information indicating a request type and the physical location; and issuing the data access request to a SSD.

18 Claims, 8 Drawing Sheets

(56) References Cited

U.S. PATENT DOCUMENTS

| | | | |
|---|---|---|---|
| 2016/0291866 A1* | 10/2016 | Olcay | G06F 3/061 |
| 2016/0313943 A1* | 10/2016 | Hashimoto | G06F 16/00 |
| 2016/0350003 A1 | 12/2016 | Kanno | |
| 2017/0060744 A1* | 3/2017 | Saitou | G06F 3/0647 |
| 2017/0131917 A1* | 5/2017 | Yun | G06F 3/0611 |
| 2017/0139837 A1 | 5/2017 | Tomlin | |
| 2017/0242722 A1* | 8/2017 | Qiu | G06F 13/385 |
| 2017/0262175 A1* | 9/2017 | Kanno | G06F 3/061 |
| 2017/0329522 A1 | 11/2017 | Yang | |
| 2017/0357462 A1* | 12/2017 | Walker | G06F 12/0623 |
| 2018/0004650 A1* | 1/2018 | Battaje | G06F 12/0246 |
| 2018/0063145 A1* | 3/2018 | Cayton | H04L 63/101 |
| 2018/0077173 A1* | 3/2018 | Motwani | H04L 63/1416 |
| 2018/0113804 A1* | 4/2018 | Hsu | G06F 3/0673 |
| 2018/0121344 A1* | 5/2018 | Seo | G06F 12/0246 |
| 2019/0035452 A1* | 1/2019 | Borole | G11C 11/4094 |
| 2019/0205244 A1* | 7/2019 | Smith | G06F 12/12 |

FOREIGN PATENT DOCUMENTS

| | | | |
|---|---|---|---|
| CN | 102866956 | A | 1/2013 |
| CN | 104407813 | A | 3/2015 |
| CN | 105426315 | A | 3/2016 |
| CN | 105528299 | A | 4/2016 |
| CN | 106201335 | A | 12/2016 |
| CN | 106527987 | A | 3/2017 |
| CN | 106682003 | A | 5/2017 |
| CN | 106708423 | A | 5/2017 |
| TW | 201500923 | A | 1/2015 |
| TW | 201508485 | A | 3/2015 |
| TW | I564809 | B | 1/2017 |
| TW | I570737 | B | 2/2017 |

\* cited by examiner

US 10,936,482 B2

METHODS FOR CONTROLLING SSD (SOLID STATE DISK) AND APPARATUSES USING THE SAME

CROSS REFERENCE TO RELATED APPLICATIONS

This application claims priority of China Patent Application No. 201710384048.0, filed on May 26, 2017, the entirety of which is incorporated by reference herein.

BACKGROUND

Technical Field

The present invention relates to storage devices, and in particular to methods for controlling an SSD (Solid State Disk) and apparatuses using the same.

Description of the Related Art

An SSD is typically equipped with NAND flash devices. NAND flash devices are not random access but serial access. It is not possible for NOR to access any random address. Instead, the host has to write into the NAND flash devices a sequence of bytes which identify both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word. In practice, to improve the write speed, data of continuous logic addresses may be dispersed into physical storage units, and a storage mapping table is used to point to where the data is written in physical storage units. Accordingly, what is needed are methods for controlling an SSD to improve the access performance to reflect the characteristics of the NAND flash devices, and apparatuses that use these methods.

BRIEF SUMMARY

An embodiment of a method for controlling an SSD (Solid State Disk), performed by a processing unit when loading and executing a driver, comprises: obtaining a data access command comprising information indicating a namespace, a command type, and a logical storage address; determining one of a plurality of storage mapping tables according to the namespace; reading a physical location corresponding to the logical storage address from the determined storage mapping table; and generating, and then issuing a data access request to the SSD, where the data access request comprises information indicating the request type and the physical location.

An embodiment of an apparatus for controlling an SSD comprises a memory and a processing unit coupled to the memory. The memory stores a plurality of storage mapping tables. The processing unit, when loading and executing a driver, obtains a data access command comprising information indicating a namespace, a command type, and a logical storage address; determines one of the storage mapping tables according to the namespace; reads a physical location corresponding to the logical storage address from the determined storage mapping table; and generates a data access request comprising information indicating a request type and the physical location, and issues the data access request to the SSD.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. Furthermore, It should be understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
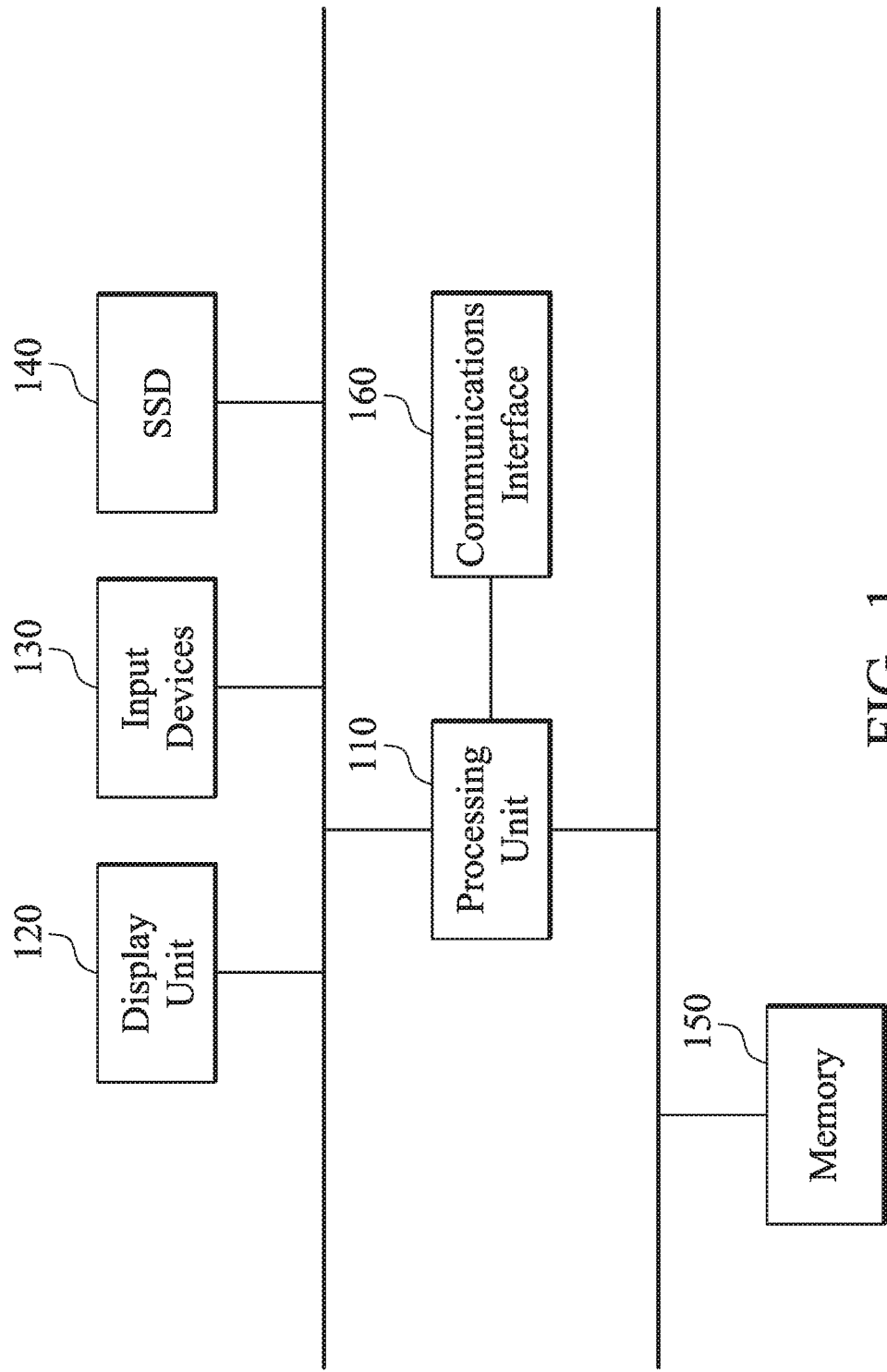
FIG. 1 is the system architecture of a computer apparatus according to an embodiment of the invention.

FIG. 1 is the system architecture of a computer apparatus according to an embodiment of the invention. The system architecture may be practiced in a desktop computer, a notebook computer, a tablet computer, a mobile phone, or another electronic apparatus with a computation capability. A processing unit 110 can be implemented in numerous ways, such as with dedicated hardware, or with general-purpose hardware (e.g., a single processor, multiple processors or graphics processing units capable of parallel computations, etc.) that is programmed using microcode or software instructions to perform the functions recited herein. The processing unit 110 may include an ALU (Arithmetic and Logic Unit) and a bit shifter. The ALU is responsible for performing Boolean operations (such as AND, OR, NOT, NAND, NOR, XOR, XNOR etc.) and also for performing integer or floating-point addition, subtraction, multiplication, division, etc. The bit shifter is responsible for bitwise shifts and rotations. The system architecture further includes a memory 150 for storing necessary data in execution, such as variables, data tables, etc., and an SSD (Solid State Disk) 140 for storing a wide range of electronic files, such as Web pages, digital documents, video files, audio files, etc. A communications interface 160 is included in the system architecture and the processing unit 110 can thereby communicate with another electronic apparatus. The communications interface 160 may be a LAN (Local Area Network) communications module or a WLAN (Wireless Local Area Network) communications module. The system architecture further includes one or more input devices 130 to receive user input, such as a keyboard, a mouse, a touch panel, etc. A user may press hard keys on the keyboard to input characters, control a mouse pointer on a display by operating the mouse, or control an executed application with one or more gestures made on the touch panel. The gestures include, but are not limited to, a single-click, a double-click, a single-finger drag, and a multiple finger drag. A display unit 120 may include a display panel, such as a TFT-LCD (Thin film transistor liquid-crystal display) panel or an OLED (Organic Light-Emitting Diode) panel, to display input letters, alphanumeric characters, symbols, dragged paths, drawings, or screens provided by an application for the user to view. The processing unit 110 is disposed outside of the SSD 140 physically.

Figure 2:
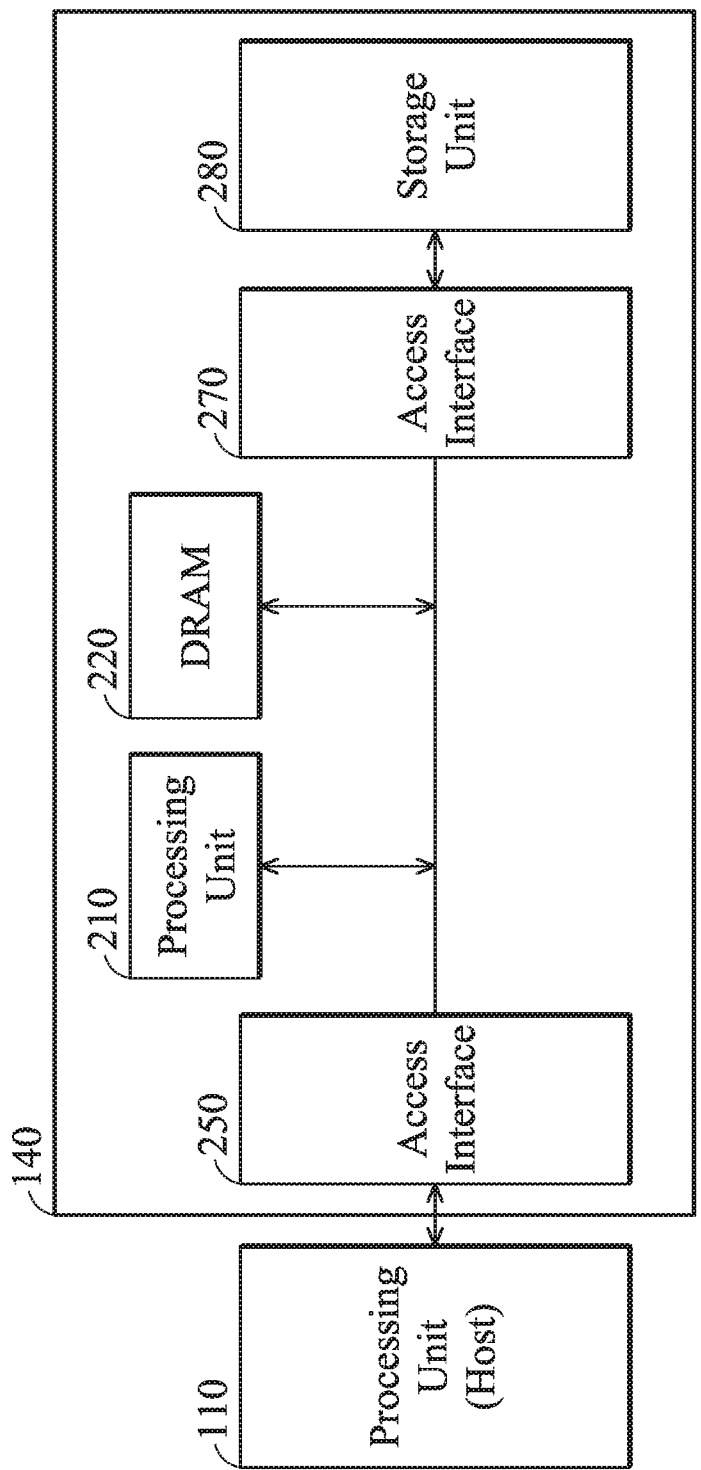
FIG. 2 is the system architecture of an SSD according to an embodiment of the invention.

FIG. 2 is the system architecture of an SSD according to an embodiment of the invention. The system architecture of the SSD 140 contains a processing unit 210 being configured to write data into a designated address of a storage unit 280, and read data from a designated address thereof. Specifically, the processing unit 210 writes data into a designated address of the storage unit 280 through an access interface 270 and reads data from a designated address thereof through the same interface 270. The system architecture uses several electrical signals for coordinating commands and data transfer between the processing unit 210 and the storage unit 280, including data lines, a clock signal and control lines. The data lines are employed to transfer commands, addresses and data to be written and read. The control lines are utilized to issue control signals, such as CE (Chip Enable), ALE (Address Latch Enable), CLE (Command Latch Enable), WE (Write Enable), etc. The access interface 270 may communicate with the storage unit 280 using a SDR (Single Data Rate) protocol or a DDR (Double Data Rate) protocol, such as ONFI (open NAND flash interface), DDR toggle, or others. The processing unit 210 may communicate with the processing unit 110 (may be referred to as a host) through an access interface 250 using a standard protocol, such as USB (Universal Serial Bus), ATA (Advanced Technology Attachment), SATA (Serial ATA), PCI-E (Peripheral Component Interconnect Express) or others.

Figure 3:
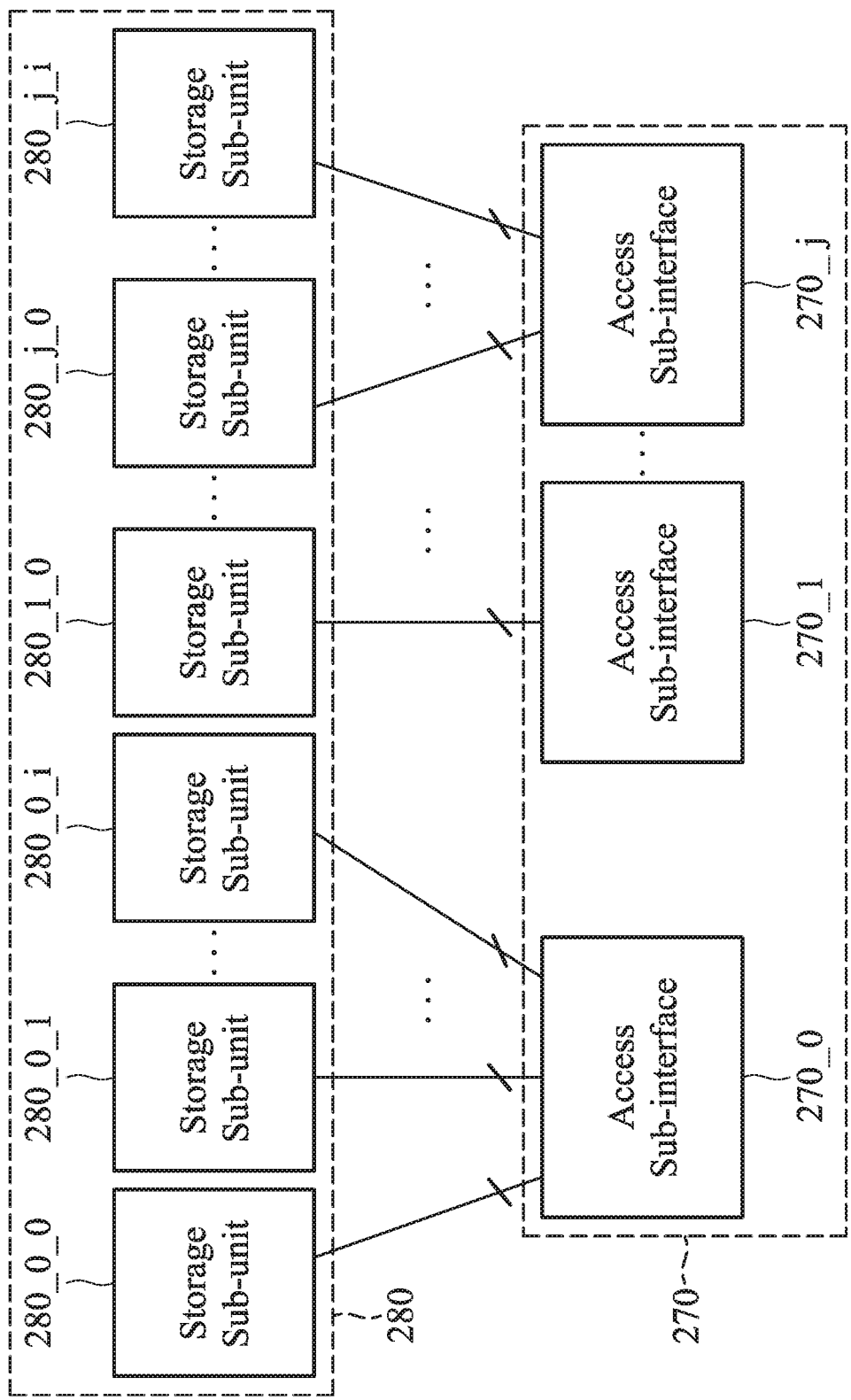
FIG. 3 is a schematic diagram illustrating an access interface to a storage unit according to an embodiment of the invention.
Figure 4:
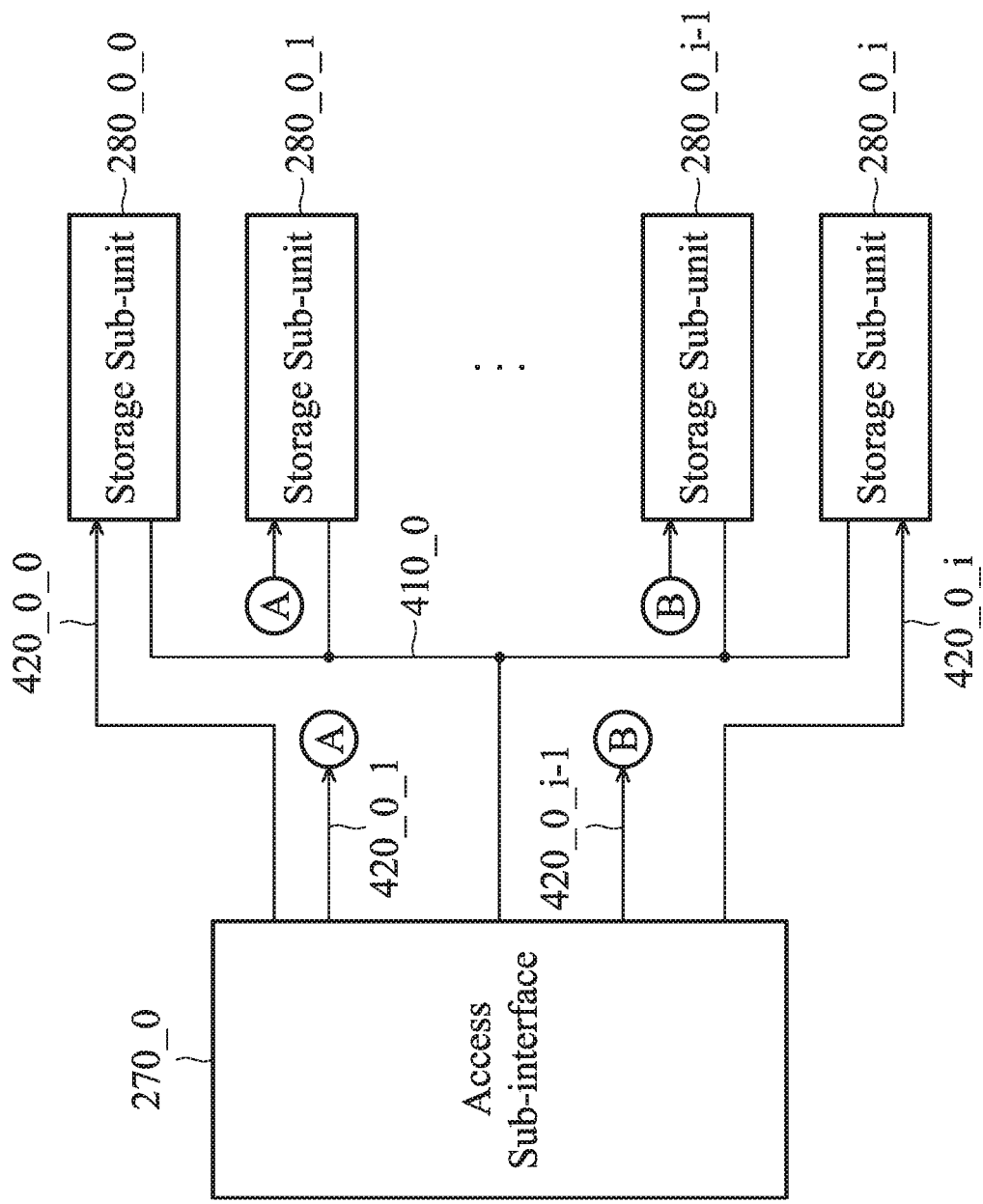
FIG. 4 is a schematic diagram depicting connections between one access sub-interface and multiple storage sub-units according to an embodiment of the invention.

The storage unit 280 may contain multiple storage sub-units and each storage sub-unit may be practiced in a single die and use a respective access sub-interface to communicate with the processing unit 210. FIG. 3 is a schematic diagram illustrating an access interface to a storage unit according to an embodiment of the invention. The SSD 140 may contain j+1 access sub-interfaces 270_0 to 270_j, where the access sub-interfaces may be referred to as channels, and each access sub-interface connects to i+1 storage sub-units. That is, i+1 storage sub-units may share the same access sub-interface. For example, assume that the SSD 140 contains 4 channels (j=3) and each channel connects to 4 storage sub-units (i=3): The SSD 140 has 16 storage sub-units 280_0_0 to 280_j_i in total. The processing unit 210 may direct one of the access sub-interfaces 270_0 to 270_j to read data from the designated storage sub-unit. Each storage sub-unit has an independent CE control signal. That is, it is required to enable a corresponding CE control signal when attempting to perform a data read from a designated storage sub-unit via an associated access sub-interface. It is apparent that any number of channels may be provided in the SSD 140, and each channel may be associated with any number of storage sub-units, and the invention should not be limited thereto. FIG. 4 is a schematic diagram depicting connections between one access sub-interface and multiple storage sub-units according to an embodiment of the invention. The processing unit 210, through the access sub-interface 270_0, may use independent CE control signals 420_0_0 to 420_0_i to select one of the connected storage sub-units 280_0_0 and 280_0_i, and then program data into the designated location of the selected storage sub-unit via the shared data line 410_0.

In some implementations, the host 110 may provide an LBA (Logical Block Address) to the processing unit 210 through the access interface 250 to indicate a particular region for data to be read from or written into. In order to optimize the data write efficiency, the access interface 270 distributes data with continuous LBAs across different physical regions of the storage unit 280. Thus, the SSD 140 needs to store a storage mapping table, also referred to as an H2F (Host-to-Flash) table, in a DRAM (Dynamic Random Access Memory) 220 to indicate which location in the storage unit 280 data of each LBA is physically stored in. However, since the SSD 140 has no knowledge about application executions of the host 110, the physical-data placement optimized by the access interface 270 may not satisfy the requirements of the host 110.

Through the methods for controlling an SSD introduced by embodiments of the invention, it can realize the purpose of including the optimization logics of physical-data placement in the host 110. The host 110 may store multiple H2F tables in the memory 150 and each H2F table is associated with a namespace. The host 110 defines different visible scopes of the SSD 140 for different namespaces. The namespace may be an ID (Identifier) in 64 or 128 bits, such as an UUID (Universally Unique Identifier), a GUID (Globally Unique Identifier) etc., or a user ID in a specific length. The host 110 may provide different QoS (Quality of Service) for different namespaces and schedule data access commands for the namespaces according to QoS for the namespaces. The QoS describes requirements for accessing data of the corresponding namespace, such as a throughput, a waiting time, etc. The host 110 may record execution logs corresponding to different namespaces, for example, the data access commands of the namespaces were executed at specific moments, etc. The QoS and execution logs for the namespaces may be realized in a wide range of data structures, such as data arrays, database tables, file records, etc., and stored in the memory 150. The memory 150 stores a namespace mapping table including information about an address of the memory 150 for storing a H2F table for each namespace. An exemplary namespace mapping table may be illustrated in Table 1 as follows:

TABLE 1

| Namespace | Start Address |
| --- | --- |
| 123e4567-e89b-12d3-a456-426655440000 | 0x10000 |
| 123e4567-e89b-12d3-a456-665544000042 | 0x20000 |
| 123e4567-e89b-12d3-a456-554400004266 | 0x30000 |

The namespace mapping table contains three records to describe that the H2F table for the namespace "123e4567-e89b-12d3-a456-426655440000" is stored from the address 0x10000 of the memory 150, the H2F table for the namespace "123e4567-e89b-12d3-a456-665544000042" is stored from the address 0x20000 of the memory 150 and the H2F table for the namespace "123e4567-e89b-12d3-a456-554400004266" is stored from the address 0x30000 of the memory 150.

Figure 5A:
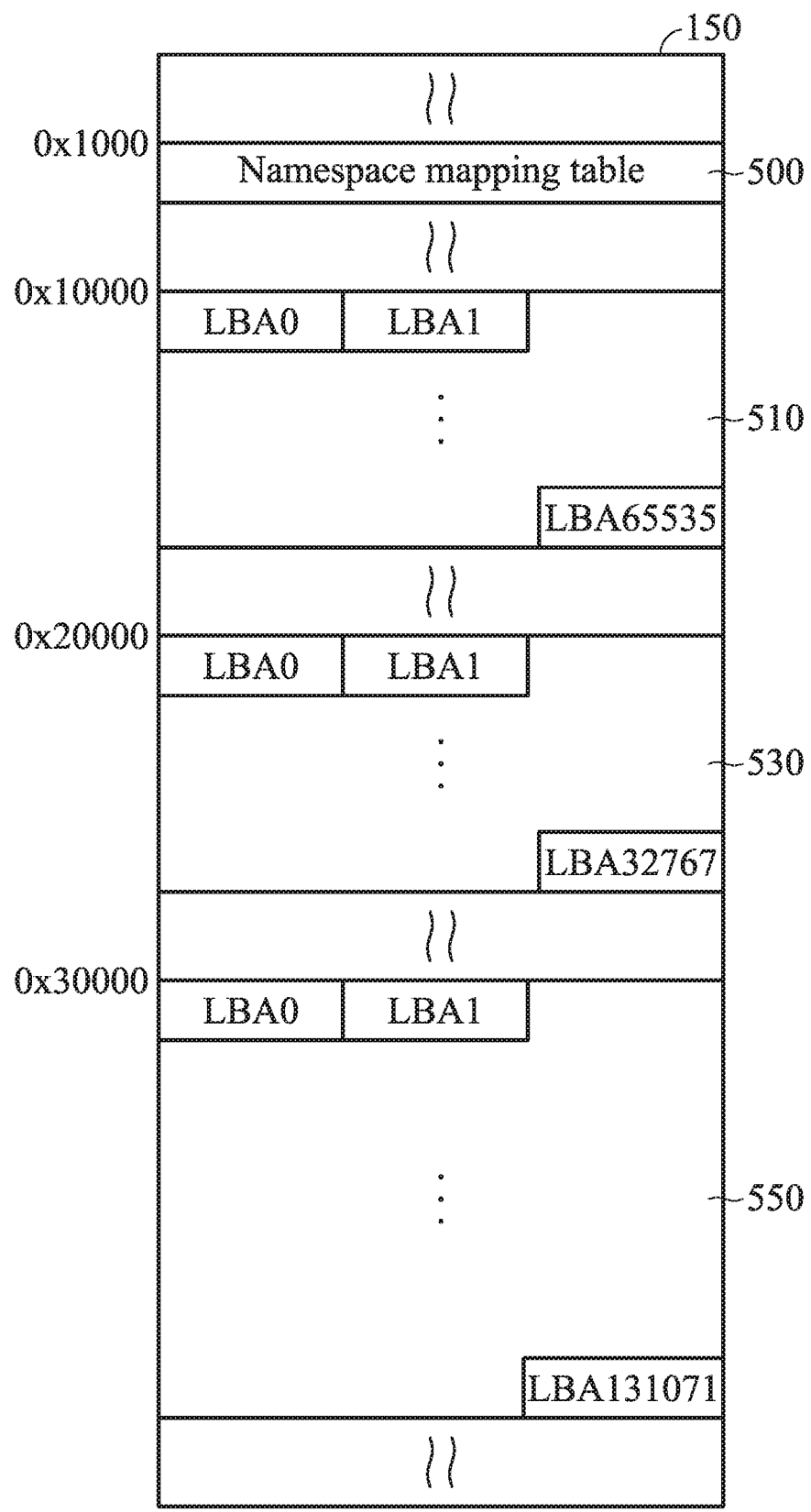
FIG. 5A is a schematic diagram of the memory allocation for storage mapping tables according to an embodiment of the invention.
Figure 5B:
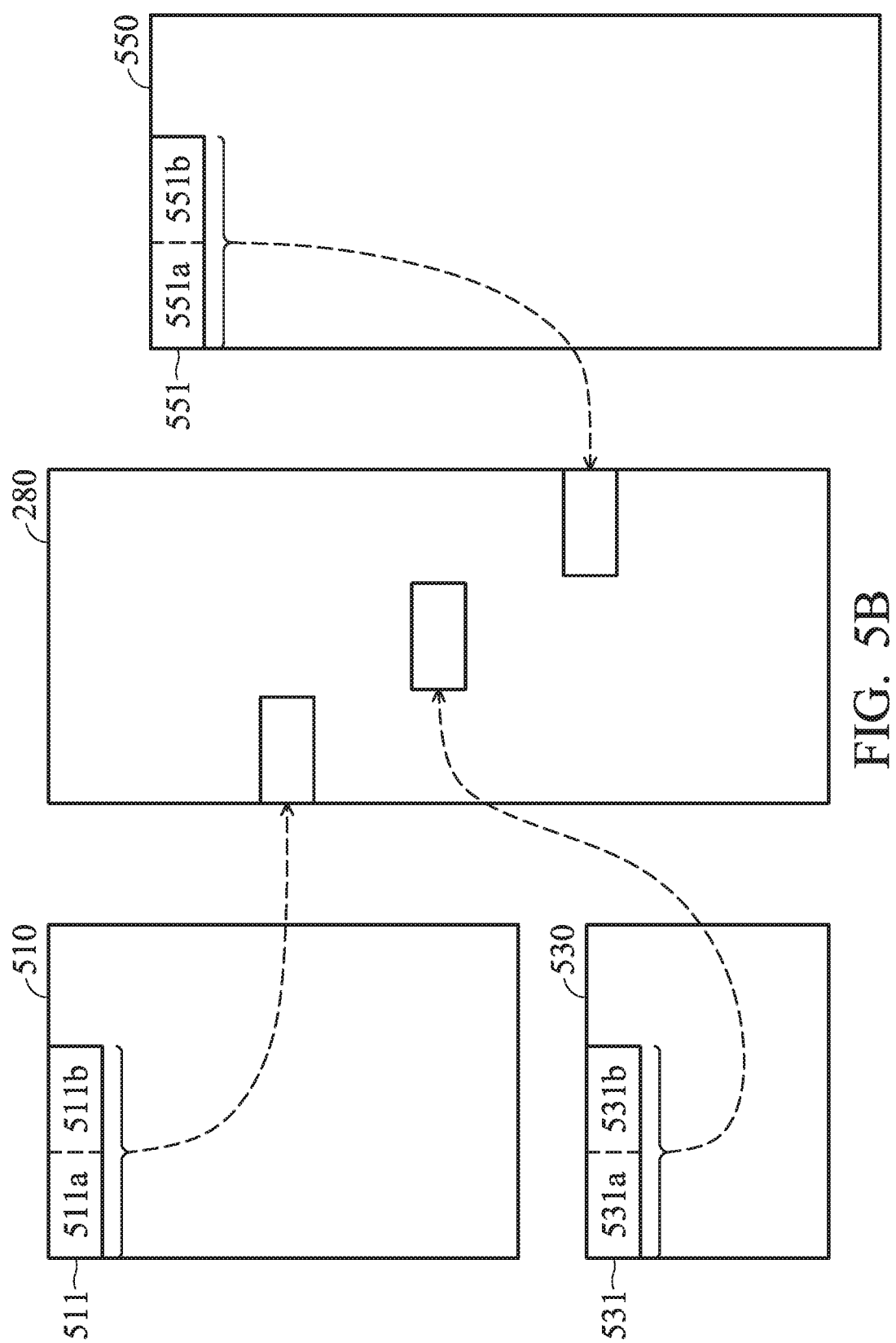
FIG. 5B is a schematic diagram illustrating physical storage maps according to an embodiment of the invention.

FIG. 5A is a schematic diagram of the memory allocation for storage mapping tables according to an embodiment of the invention. The memory 150 may store the namespace mapping table 500, the H2F table 510 for the namespace "123e4567-e89b-12d3-a456-426655440000", the H2F table 530 for the namespace "123e4567-e89b-12d3-a456-665544000042" and the H2F table 550 for the namespace "123e4567-e89b-12d3-a456-554400004266". Each of the H2F tables 510, 530 and 550 stores information regarding which location in the storage unit 280 data of each logical storage address is physically stored in, and the information is placed in order of the logical storage addresses. The logical storage addresses may be represented by LBAs, and each LBA is associated with a fixed-length of physical storage space, such as 256K, 512K or 1024K bytes. For example, the H2F table 510 stores the physical locations of the logical storage addresses from LBA0 to LBA65535 in sequence, the H2F table 530 stores the physical locations of the logical storage addresses from LBA0 to LBA32767 in sequence and the H2F table 550 stores the physical locations of the logical storage addresses from LBA0 to LBA131071 in sequence. FIG. 5B is a schematic diagram illustrating physical storage maps according to an embodiment of the invention. The physical location of each logical block may be represented in four bytes. For example, the H2F tables for the namespaces contain physical locations 511, 531 and 551 of LBA0, respectively. It should be noted that, although data for different namespaces is addressed by the same logical storage address (e.g. LBA0), a physical location corresponding to this logical storage address for a designated namespace can be found by searching the H2F table for the designated namespace. The physical location 511 records a block number 511a in two bytes and a unit number 511b in two bytes to point to a physical location of the storage unit 280. Similarly, the physical location 531 records a block number 531a in two bytes and a unit number 531b in two bytes and the physical location 551 records a block number 551a in two bytes and a unit number 551b in two bytes to point to two physical locations of the storage unit 280, respectively. It should be noted that the optimization of physical-data placement cannot be realized by the conventional host because it does not store information of a H2F table, or the like. Let alone the optimization of physical-data placement for different namespaces.

Figure 6:
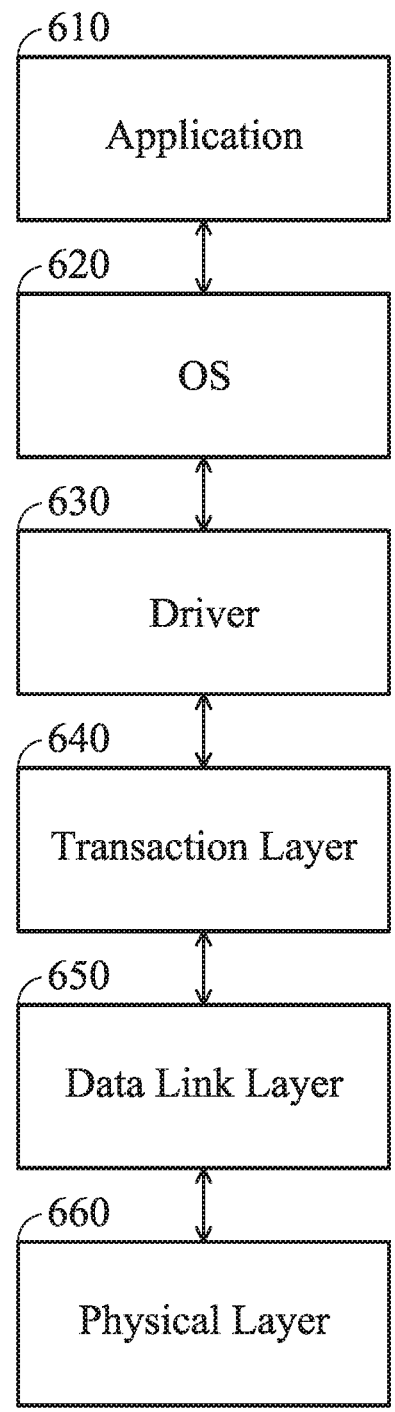
FIG. 6 is a schematic diagram illustrating layers of PCI-E (Peripheral Component Interconnect Express) according to an embodiment of the invention.

FIG. 6 is a schematic diagram illustrating layers of PCI-E (Peripheral Component Interconnect Express) according to an embodiment of the invention. An application 610 reads data from a designated address of the SSD 140 or writes data into a designated address of the SSD 140 through an OS (Operating System) 620. The OS 620 sends commands to a driver 630 and the driver 630 generates and sends a corresponding read or write request to a transaction layer 640 accordingly. The transaction layer 640 employs the split-transaction protocol in the packet architecture to the SSD 140 through a data link layer 650 and a physical layer 660.

Figure 7:
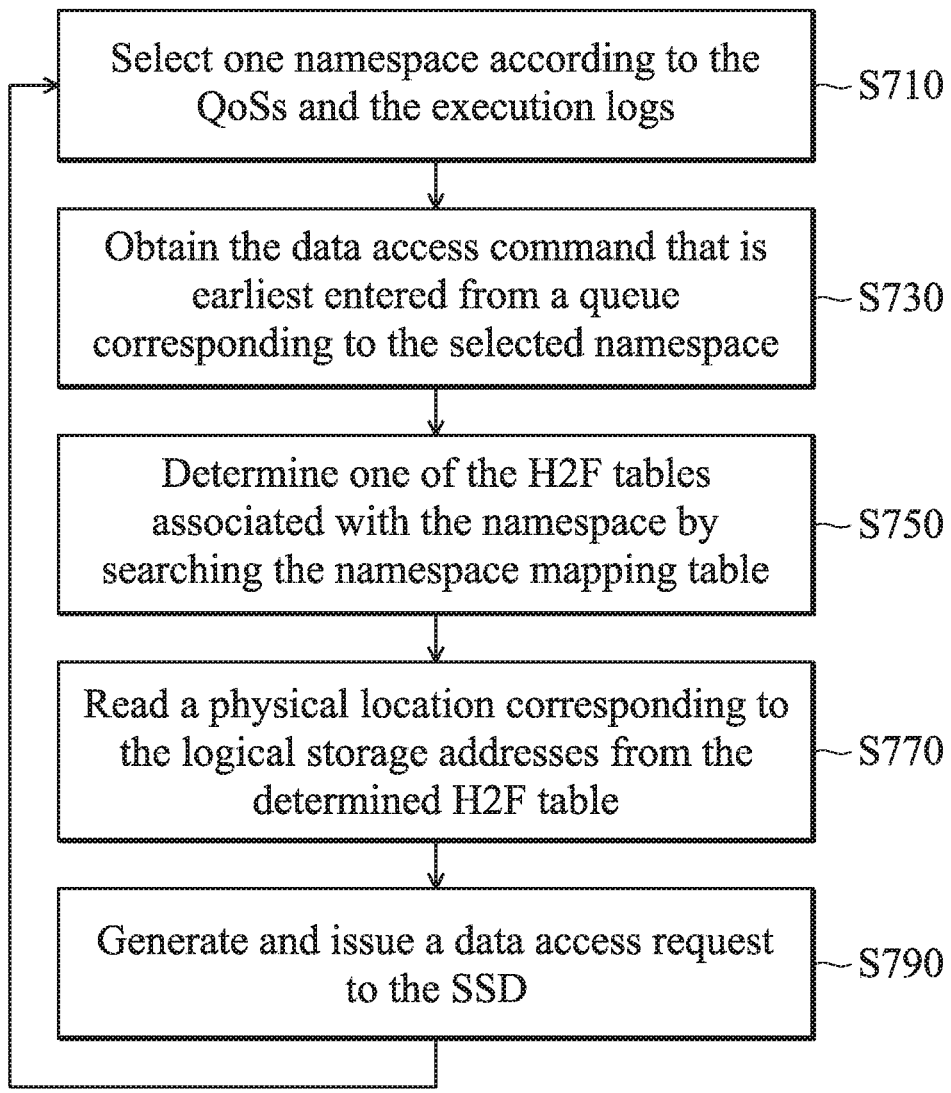
FIG. 7 is a flowchart illustrating a method for controlling an SSD according to an embodiment of the invention.

The driver 630 may receive data access commands from an upper layer and push the data access commands into one or more FIFO (First-In-First-Out) queues successively according to the reception times. The upper layer may be the application 610 or the OS 620. For example, the memory 150 may allocate space for three FIFO queues associated with the namespaces "123e4567-e89b-12d3-a456-426655440000", "123e4567-e89b-12d3-a456-665544000042" and "123e4567-e89b-12d3-a456-554400004266". FIG. 7 is a flowchart illustrating a method for controlling an SSD according to an embodiment of the invention. The method is performed when the processing unit 110 loads and executes the driver 630. The method repeatedly executes a loop (steps S710 to S770) for dealing with a data access command issued by the application 610. In each iteration, one of the namespaces is selected according to the QoSs and the execution logs (step S710), the data access command that is earliest entered is obtained from a queue corresponding to the selected namespace, where the data access command includes information indicating at least a namespace, a command type, a logical storage addresses for the data access command (step S730), one of the H2F tables associated with the namespace is determined by searching the namespace mapping table 500 (step S750), a physical location corresponding to the logical storage addresses is read from the determined H2F table (step S770) and a data access request is generated and issued to the SSD 140, where the data access request includes information indicating at least a request type and the physical location for the data access request (step S790). The command type of the data access command may be a data read, a data write, etc. For example, the data access command may instruct the SSD 140 to read data from the addresses ranging from LBA0 to LBA10 associated with the namespace "123e4567-e89b-12d3-a456-426655440000". Or, the data access command may instruct the SSD 140 to write data into the addresses ranging from LBA0 to LBA10 associated with the namespace "123e4567-e89b-12d3-a456-426655440000". It should be noted that, when receiving the data access request, the processing unit 210 of the SSD 140 does not perform any address conversion of a logical storage address into a physical location. The processing unit 210 of the SSD 140 can directly drive the access interface 270 to read data from the physical location that is received from the data access request or write data into the physical location that is received from the data access request.

Although the embodiment has been described as having specific elements in FIGS. 1 to 4, it should be noted that additional elements may be included to achieve better performance without departing from the spirit of the invention. While the process flow described in FIG. 7 includes a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for controlling an SSD (Solid State Disk), performed by a first processing unit of a host when loading and executing a driver, comprising:

using the first processing unit of the host to obtain a data access command comprising information indicating a namespace, a command type, and a logical block address, wherein the namespace is determined according to QoSs (Quality of Services) and execution logs, and the execution logs comprise the data access command of the namespace executed at a specific moment;

using the first processing unit of the host to determine one of a plurality of storage mapping tables according to the namespace;

using the first processing unit of the host to read a physical block address mapped to the logical block address from the determined storage mapping table;

using the first processing unit of the host to generate a data access request comprising information indicating a request type and the physical block address; and using the first processing unit of the host to issue the data access request to a second processing unit of the SSD, wherein the host has a memory for storing a namespace mapping table including information about addresses of the memory for storing the plurality of storage mapping tables, wherein one of the storage mapping tables is for storing a physical location of a logical storage address, the physical location for recording a block number in two bytes and a unit number in two bytes.

2. The method of claim 1, wherein the determined storage mapping table stores information regarding which location in a storage unit of the SSD data of each logical block address associated with the namespace is physically stored in, based on an order of logical block addresses.

3. The method of claim 1, wherein the step of using the first processing unit of the host to determine one of the plurality of storage mapping tables according to the namespace comprises:

using the first processing unit of the host to determine the storage mapping table associated with the namespace by searching the namespace mapping table.

4. The method of claim 3, wherein the namespace mapping table comprises information about an address for storing the storage mapping table associated with the namespace.

5. The method of claim 4, wherein the namespace mapping table comprises information about a start address of the memory for storing the storage mapping table associated with each namespace.

6. The method of claim 1, wherein the data access command is received from an upper layer.

7. The method of claim 6, wherein the upper layer is an application or an OS (Operating System).

8. The method of claim 1, wherein the first processing unit is disposed physically outside of the SSD.

9. The method of claim 1, comprising:

selecting the namespace from a plurality of namespaces according to the QoSs (Quality of Services) and the execution logs, wherein the data access command is obtained from a queue corresponding to the selected namespace.

10. A host for controlling an SSD (Solid State Disk), comprising:

a memory, storing a plurality of storage mapping tables; and a first processing unit, coupled to the memory, wherein when loading and executing a driver, the first processing unit: obtains a data access command comprising information indicating a namespace, a command type, and a logical block address, wherein the namespace is determined according to QoSs (Quality of Services) and execution logs, and the execution logs comprise the data access command of the namespace executed at a specific moment; determines one of the storage mapping tables according to the namespace; reads a physical block address mapped to the logical block address from the determined storage mapping table; generates a data access request comprising information indicating a request type and the physical block address; and issues the data access request to a second processing unit of the SSD, wherein the memory is for storing a namespace mapping table including information about addresses of the memory for storing the plurality of storage mapping tables, wherein one of the storage mapping tables is for storing a physical location of a logical storage address, the physical location for recording a block number in two bytes and a unit number in two bytes.

11. The host of claim 10, wherein the determined storage mapping table stores information regarding which location in a storage unit of the SSD data of each logical block address associated with the namespace is physically stored in, based on an order of logical block addresses.

12. The host of claim 10, wherein the first processing unit searches the namespace mapping table to determine the storage mapping table associated with the namespace.

13. The host of claim 12, wherein the namespace mapping table comprises information about an address for storing the storage mapping table associated with the namespace.

14. The host of claim 13, wherein the namespace mapping table comprises information about a start address of the memory for storing the storage mapping table associated with each namespace.

15. The host of claim 10, wherein the data access command is received from an upper layer.

16. The host of claim 15, wherein the upper layer is an application or an OS (Operating System).

17. The host of claim 10, wherein the first processing unit is disposed physically outside of the SSD.

18. The host of claim 10, wherein the first processing unit selects the namespace from a plurality of namespaces according to the QoSs (Quality of Services) and the execution logs and the data access command is obtained from a queue corresponding to the selected namespace.

* * * * *